(12) United States Patent
Roks

(10) Patent No.: US 7,387,659 B2
(45) Date of Patent: Jun. 17, 2008

(54) PNEUMATICALLY OPERATED AUTOMATIC SHUTOFF CIRCUIT FOR CONTROLLING THE GENERATION OF GAS

(75) Inventor: Martinus Franciscus Maria Roks, Middelbeers (NL)

(73) Assignee: Parker Hannifin Corporation, Cleveland, OH (US)

(*) Notice: Subject to any disclaimer, the term of this patent is extended or adjusted under 35 U.S.C. 154(b) by 542 days.

(21) Appl. No.: 11/048,502

(22) Filed: Feb. 1, 2005

(65) Prior Publication Data
US 2006/0169137 A1 Aug. 3, 2006

(51) Int. Cl.
*B01D 53/22* (2006.01)
(52) U.S. Cl. ............... 95/22; 95/19; 95/54; 96/4; 96/421; 137/624.27; 137/906
(58) Field of Classification Search ............ 95/19, 95/22, 23, 52, 54, 130, 138; 96/4, 8, 417, 96/421, 422; 137/102, 489.5, 624.27, 900, 137/906
See application file for complete search history.

(56) References Cited

U.S. PATENT DOCUMENTS

| | | | | |
|---|---|---|---|---|
| 3,620,252 A | * | 11/1971 | Topfer et al. | 137/625.6 |
| 3,823,725 A | * | 7/1974 | Akiyama et al. | 137/900 |
| 4,119,417 A | * | 10/1978 | Heki et al. | 96/8 |
| 4,291,720 A | * | 9/1981 | Folland | 137/423 |
| 4,421,529 A | * | 12/1983 | Revak et al. | 95/54 |
| 4,701,742 A | | 10/1987 | Ruehr | |
| 4,806,132 A | * | 2/1989 | Campbell | 95/54 |
| 4,857,082 A | * | 8/1989 | DiMartino et al. | 95/19 |
| 5,281,253 A | * | 1/1994 | Thompson | 95/22 |
| 5,302,189 A | | 4/1994 | Barbe et al. | |
| 5,388,413 A | | 2/1995 | Major et al. | |
| 5,470,379 A | * | 11/1995 | Garrett | 95/54 |
| 5,496,388 A | * | 3/1996 | Tellier | 96/4 |
| 5,588,984 A | | 12/1996 | Verini | |
| 5,688,306 A | | 11/1997 | Verini | |
| 5,829,272 A | * | 11/1998 | Barry | 95/54 |
| 5,843,212 A | * | 12/1998 | Nanaji | 95/22 |
| 5,855,646 A | | 1/1999 | Verini | |
| 6,273,936 B1 | * | 8/2001 | Barry et al. | 95/22 |
| 6,290,750 B1 | | 9/2001 | Ollivier et al. | |
| 6,332,917 B1 | | 12/2001 | Schöllkopf | |
| 6,348,082 B1 | | 2/2002 | Murdoch et al. | |
| 6,604,558 B2 | | 8/2003 | Sauer | |

* cited by examiner

*Primary Examiner*—Jason M Greene
(74) *Attorney, Agent, or Firm*—Renner, Otto, Boisselle & Sklar, LLP

(57) ABSTRACT

An automatic shut off circuit for controlling the flow of a gas through a gas separation system is disclosed. The gas separation system includes a gas separation module for separating nitrogen from air, and a non-electric automatic shut off circuit for controlling the delivery of air to the gas separation module. The non-electric automatic shut off circuit includes a pneumatically operated valve that enables or inhibits a flow of air to the gas separation module, and a pneumatic pressure switch operatively coupled to the pneumatically operated valve, wherein the pneumatic pressure switch monitors a pressure indicative of a demand for nitrogen, and the pneumatic pressure switch commands the pneumatically operated valve to enable or inhibit the flow of air based on the monitored pressure.

16 Claims, 2 Drawing Sheets

PNEUMATICALLY OPERATED AUTOMATIC SHUTOFF CIRCUIT FOR CONTROLLING THE GENERATION OF GAS

FIELD OF THE INVENTION

The present invention relates generally to gas generation systems and, more specifically, to a pneumatic auto shutoff circuit for controlling the delivery of a gas.

BACKGROUND OF THE INVENTION

Due to its inert properties, nitrogen gas has long been a widely used industrial gas. Industrial applications include, for example, packaging of perishable foods, provision of non-explosive atmospheres, reducing atmospheres for soldering and brazing, electronic component manufacture and storage, chemical transferring, sparging and mixing, and tire inflation.

Nitrogen gas, when used for tire inflation, has been known to increase the life of the tire. This is due in part to a reduction in oxidative aging, which is caused by the diffusion of oxygen through the wall of the tire. A tire inflated with nitrogen does not experience oxidative aging to the same level as an air-filled tire and, therefore, the life expectancy of the tire is increased. Additionally, the permeation of oxygen through the wall of the tire reduces the tire inflation pressure. If not corrected, improper inflation can cause uneven tire wear, which also reduces the life of the tire. Tests have shown a significant reduction in tire failure for tires inflated with nitrogen as opposed to air.

Traditionally, nitrogen has been produced by distillation of liquified air, and has been provided to industrial users in high pressure canisters. Typically, these canisters are large and heavy. While nitrogen gas is generally readily available and inexpensive, transportation, storage and rental of nitrogen gas containers can be costly for the industrial user. Also, there is always some danger associated with transportation and handling of high pressure gases. In applications where nitrogen gas must be used in remote locations, the danger, cost and inconvenience of transporting and handling large, heavy, high pressure containers is compounded. An example of such situations is the on site repair of refrigeration systems during which nitrogen gas may be used for purging of refrigeration systems before brazing operations, charging systems for leak checking, and for breaking vacuums in large chillers.

Recently, nitrogen gas has been produced utilizing selectively permeable membranes, such as membranes developed by Dow Chemical Company. To produce nitrogen gas, pressurized air is passed through thin hollow fibers fabricated of the selectively permeable membrane material. Oxygen, water and other gases permeate through the membrane wall of the fibers more rapidly than nitrogen, leaving a stream of substantially pure nitrogen.

This method has been used to produce nitrogen on an industrial scale for subsequent distribution in traditional, high pressure canisters. More recently, membrane nitrogen systems have been available for on site installation by industrial users of nitrogen gas. These systems are generally large and operate upon compressed air available from plant systems on location or separate dedicated compressors. Smaller units have been available for specialized applications, such as blanketing aircraft fuel tanks, and have relied upon local sources of compressed air, such as bleed air from a turbine engine compressor.

U.S. Pat. No. 5,302,189 describes a membrane nitrogen gas generator that is capable of meeting the needs of customers having highly variable flow rates. The nitrogen gas generator includes a storage receiver that is capable of storing excess production in periods of low demand. During periods of peak demand, nitrogen gas is provided from both the membrane generator and the storage receiver.

U.S. Pat. No. 5,388,413 describes a portable nitrogen generator for continuously producing nitrogen at various sites with flow rates controlled by a restrictor assembly adjusted manually to control operation. The nitrogen source uses a membrane for gas separation with air cooling and then air heating to provide proper temperatures to control the membrane temperature for gas separation.

U.S. Pat. No. 5,588,984 describes a system for producing nitrogen gas on a continuous or intermittent basis. The system includes an air compressor, which supplies compressed air to a membrane module. The membrane module separates the nitrogen from the compressed air and discharges oxygen and other gases. The nitrogen gas then flows into a vessel for storage. The system includes a back pressure control valve at both the inlet and outlet of the membrane module. The back pressure valves prevent an over-pressure condition within the system.

Current nitrogen generation systems incorporate an automatic shut off circuit for controlling the flow of compressed air to the nitrogen gas generator. Depending on the demand for nitrogen, the circuit cycles the flow of compressed air through the system. The automatic shut off circuit requires electrical power to operate the circuit and/or provides an electrical signal to control other components within the system.

SUMMARY OF THE INVENTION

The present invention relates to a gas separation system that includes a non-electric automatic shut off circuit for efficiently controlling the delivery of a gas to a gas separator.

According to one aspect, a gas separation system for separating one or more components from a plurality of components includes a gas separator and a non-electric automatic shut off circuit for controlling the delivery of the plurality of gas components to the gas separator.

In an embodiment of the invention, a nitrogen gas generation system is controlled by an automatic shut off circuit. As the automatic shut off circuit senses that nitrogen gas is being withdrawn from the system (e.g., a low storage pressure condition), the circuit enables the flow of compressed air into a gas separation module. Conversely, as the automatic shut off circuit senses that nitrogen gas is not being withdrawn from the system (e.g., a high storage pressure condition), the circuit inhibits the flow of compressed air into the gas separation module. The automatic shut off circuit reduces operating costs, since the automatic shut off circuit reduces the demand for compressed air (and thus the power required to generate the compressed air) during periods of low nitrogen gas demand. Moreover, the automatic shut-off circuit operates without electrical power, thereby enabling the generation of nitrogen gas in locations where electrical power is not readily available.

To the accomplishment of the foregoing and related ends, the invention, then, comprises the features hereinafter fully described and particularly pointed out in the claims. The following description and the annexed drawings set forth in detail certain illustrative embodiments of the invention.

These embodiments are indicative, however, of but a few of the various ways in which the principles of the invention may be employed.

DETAILED DESCRIPTION

The present invention relates to a pneumatic control circuit for automatically controlling the flow of a gas in a gas separation system. The circuit includes a pneumatic pressure switch, which monitors a pressure within the system, and a pneumatically operated valve, which controls the flow of gas to a gas separator within the system. The circuit operates without electrical power and, therefore, can operate in applications where electrical power may not be readily available or may be costly to obtain.

The present invention will be described in the context of a nitrogen gas generation system. However, the invention can be applied to other gas or pneumatic systems and the context of a nitrogen gas generation system is not intended to be limiting in any way. Other gas separation systems include, for example, dry air delivery systems and oxygen generation systems.

Figure 1:
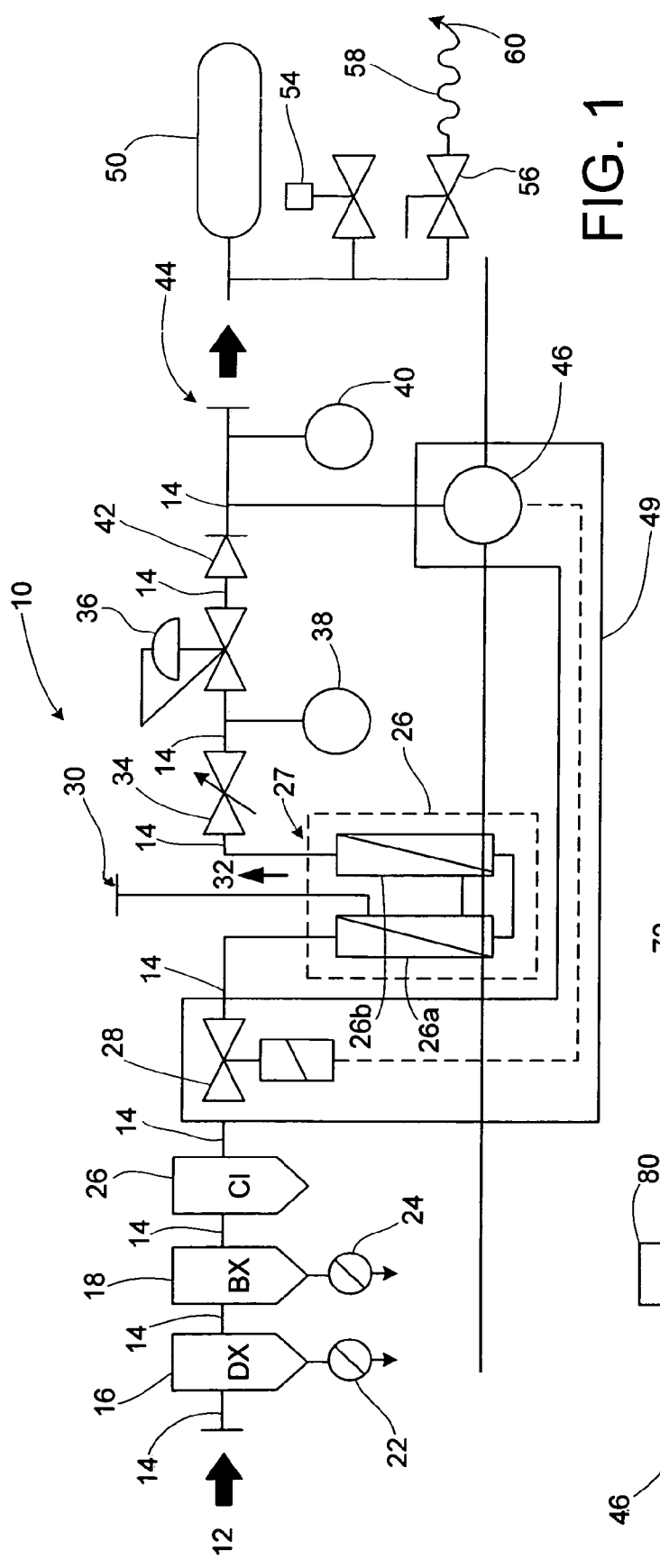
FIG. 1 is a schematic diagram of a nitrogen generation system utilizing an automatic shut off circuit in accordance with an embodiment of the invention.

With reference to FIG. 1, a nitrogen gas generation system 10 according to an embodiment of the present invention is shown. The nitrogen gas generation system 10 receives air 12 from an air compressor (not shown), preferably an oilless and reciprocating type, having an integral or attached electric motor and drawing atmospheric air through a filter. The air compressor can be a dedicated compressor for the nitrogen gas generation system 10, or the air compressor can be a central unit serving various other pieces of equipment. The compressor should be sized to produce an appropriate amount of air flow to deliver desired nitrogen product quantities.

The compressed air flows through conduit 14, constructed from plastic and/or metal tubing or pipe, either rigid or flexible, to one or more optional coalescing filters 16, 18, 20. The coalescing filters remove contaminants and/or moisture from the incoming air, thereby providing substantially clean, dry air to the gas separator. Moisture also may be removed from the air by inducing centrifugal flow, selective absorbent or adsorbent, selective membrane separation, or other devices. In a coalescing filter, moisture and other particles coalesce on a filter portion and fall to the coalescing filter bottom. Liquid removed by the one or more coalescing filters 16, 18, 20 can be purged via a purge valve 22, 24, which can be operated manually or automatically.

After passing through the coalescing filters 16, 18, 20, the compressed air 12 travels to a gas separation module 26 via conduit 14 and pneumatically operated valve 28. The pneumatically operated valve 28 enables or inhibits the flow of compressed air 12 to the gas separation module 26. As will be described in more detail below, the pneumatically operated valve 28 is operatively coupled to a pneumatic pressure switch, which provides an enable/inhibit signal to the pneumatically operated valve 28. An enable signal instructs the pneumatically operated valve 28 to open or otherwise allow the compressed air 12 to flow through the pneumatically operated valve 28. An inhibit signal instructs the pneumatically operated valve 28 to close or otherwise inhibit the flow of compressed air 28 through the pneumatically operated valve 28.

The gas separation module 26 essentially separates nitrogen from other air components, and can include one or more permeable membranes 26a, 26b. The membranes 26a, 26b can be arranged as a single membrane or as multiple membranes in a series or parallel configuration. The membranes can be constructed in hollow fiber form, or in spiral wound, pleated sheet or in any other desired configuration. Exemplary materials used in the construction of membranes are described in U.S. Pat. No. 5,388,413, the contents of which is hereby incorporated by reference in its entirety.

Compressed air 12 enters the gas separation module 26 and oxygen, carbon dioxide, moisture and other gases (hereinafter collectively referred to as exhaust gas) pass through the one or more membranes 26a, 26b within the module 26. As the exhaust gas passes through the membranes, it is purged from the system 10 via an exhaust gas outlet 30, while nitrogen 32, enriched to desired purity by the removal of exhaust gas components, flows out of the module 26 through a nitrogen outlet 27 and to a flow control valve 34 via conduit 14.

The flow control valve 34 regulates the rate of flow of nitrogen 32 out of the gas separation module 26. Low flow rates allow more exhaust gas to move through the membrane wall and, therefore, the purity of nitrogen 32 produced at the outlet 27 of the gas separation module 26 is increased. Preferably, the flow rate of the system is set to meet the requirements of the application, e.g., to produce a specific concentration of nitrogen to meet a required demand for the nitrogen.

Coupled to the flow control valve 34 via a conduit 14 is a back pressure control valve 36. The back pressure control valve 36 can be one or more orifices, venturi restrictions, flow control valves, or other pressure control device. The back pressure control valve 34 maintains constant downstream pressure, thereby minimizing the effects of external pressure disturbances. Optional pressure gauges 38, 40 provide indication of the pressure at the output of the flow control valve 34 and the outlet of the system 10, respectively. As will be appreciated, more or fewer pressure gauges can be implemented throughout the system 10 as desired.

From the back pressure control valve 36, the nitrogen gas 32 flows through conduit 14 to check valve 42, where the gas exits the system 10 via outlet 44. Check valve 42 prevents the nitrogen gas 32 from flowing back toward the gas separation module 26.

Coupled to the outlet 44 is a pneumatic pressure switch 46. The pneumatic pressure switch 46 is a non-electric pressure switch that monitors the outlet pressure of the system 10. Preferably, the pneumatic pressure switch 46 is constructed from metals such as steel, aluminum, or alloys of those materials. Other materials, such as plastic, also may be used provided the material can withstand the operating pressure and/or atmospheric conditions encountered by the pressure switch.

As was noted above, the pneumatic pressure switch 46 is operatively coupled to the pneumatically operated valve 28 via a control conduit 49 so as to form an automatic shut off circuit 48. The pneumatic pressure switch 46 and the pneumatically operated valve 28 are configured such that if the outlet pressure, as sensed by the switch 46, is below a set threshold (e.g., nitrogen 32 is being withdrawn from the system 10, thereby causing a pressure drop), the pressure switch 46, via the control conduit 49, communicates to the pressure valve 28 to enable compressed air 12 to enter the gas separation module 26, thus tending to maintain the outlet pressure of the system 10. If, however, the pressure switch 46 senses that the pressure is above a set threshold (as may arise from low or no demand for nitrogen), the pressure switch 46 communicates to the pressure valve 28 to inhibit the flow of compressed air 12 to the gas separation module 26.

For example, if nitrogen gas is not being withdrawn from the system 10, the outlet 44 may be at a pressure P1, which is greater than a preset threshold pressure Pt of the pressure switch 46. The pressure switch 46, sensing that the pressure is greater than the threshold pressure Pt, channels this pressure signal back to the pneumatically operated valve 28 via the control conduit 49. The pneumatically operated valve 28, receiving the pressure signal P1, closes the valve thereby inhibiting (e.g., stopping) the flow of compressed air 12 to the gas separation module 26. This condition may remain in effect until nitrogen is withdrawn from the system 10, which typically reduces the outlet pressure to P2, which is less than Pt. As a result, the pressure switch 46, sensing the drop in pressure at the outlet 44, terminates the pressure signal to the pneumatically operated valve 28. Residual pressure trapped within the feedback conduit 49 is bled off, preferably through a vent in the pressure switch 46. The pneumatically operated valve 28, sensing the removal of the pressure P1, opens the valve thereby enabling the flow of compressed air 12 to the gas separation module 26.

By enabling/inhibiting the flow of compressed air 12 to the gas separation module 26 on an as needed basis, less wear and tear is placed on the compressed air supply, e.g., the air compressor, as well as the coalescing filters 16, 18, 20 and the gas separation unit 26. As a result, maintenance intervals can be increased and/or the life expectancy of the equipment is increased. Additionally, the circuit does not require electrical power, thereby reducing installation and operation costs of the system 10 and providing added flexibility.

As the nitrogen gas 32 exits the system 10, it can be stored in a storage vessel 50 or it can be routed directly to a dispensing station 52, e.g., a tire inflation station. The storage vessel 50 may be any shape vessel designed to contain nitrogen gas at desired storage pressures. In the example above, the pressure in the tank would be about 90 psi, although other pressures may be used. The storage vessel 50 may be constructed from metals such as steel, aluminum, or alloys of those materials. Plastics with or without reinforcements also may be used to store the nitrogen gas 32. These plastics include polyester, ABS, nylon, and other thermoplastics or thermosetting plastics or elastomers provided they can withstand the pressures needed for storage of nitrogen gas.

The dispensing station 52 may include a solenoid or other automatic valve 54 and/or a manual operated valve 56. The combination of an automatic valve and a manual valve could be used in vending applications, for example. A factory needing intermittent and automatic production of nitrogen could elect to use only an automatic valve or only a manual valve for dispensing nitrogen. For tire inflation, filling portable vessels, or other uses, the dispensing station could include flexible hoses 58 and an air chuck 60.

The system can be placed in an enclosure (not shown) to protect the system 10 and/or to prevent tampering with the system 10. The enclosure can be constructed from metal, e.g., aluminum, steel, and alloys of metals, and/or plastic, e.g., thermosetting plastics such as polyesters, nylons with or without reinforcing fibers.

Figure 2:
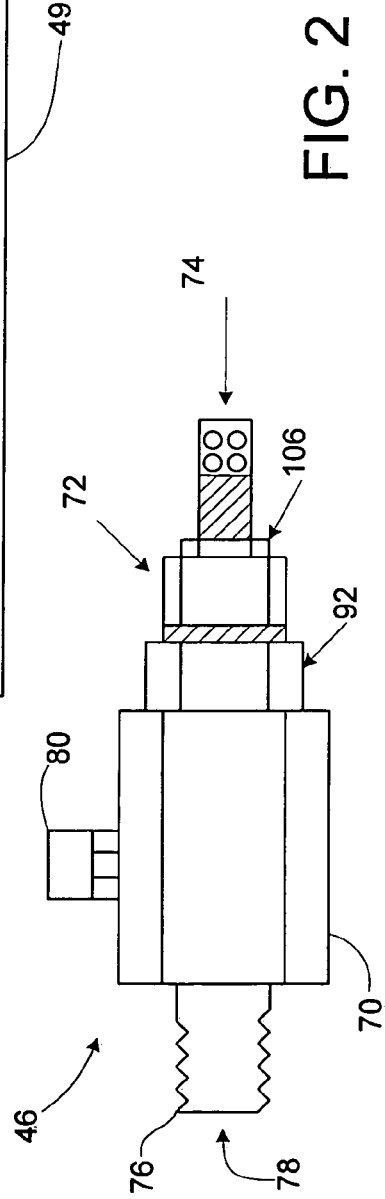
FIG. 2 is a side view of a pneumatic switch that can be used in the automatic shut off circuit shown in FIG. 1.
Figure 3:
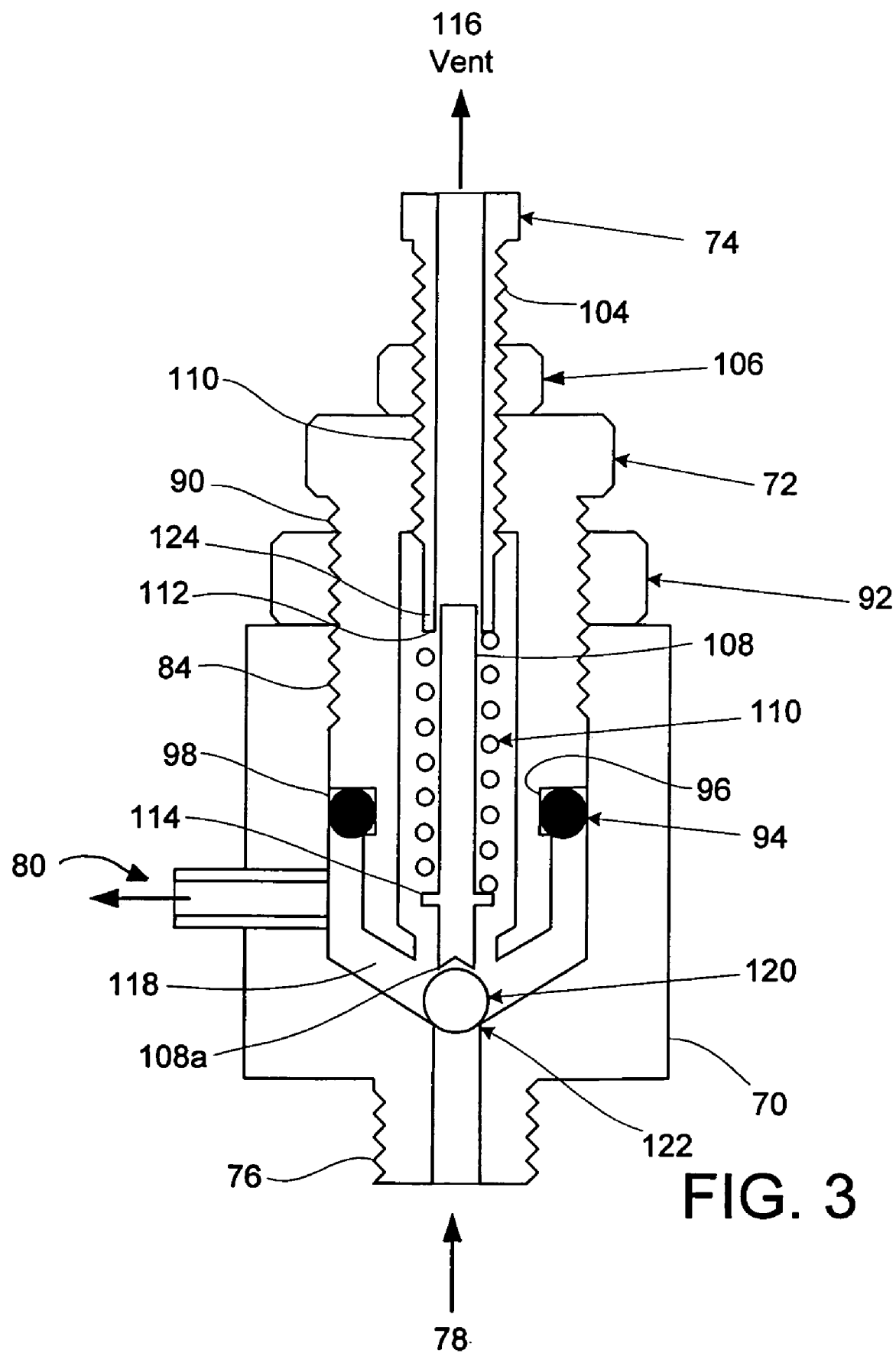
FIG. 3 is a schematic view of a pneumatic switch that can be used in the automatic shut off circuit shown in FIG. 1.

With reference now to FIGS. 2 and 3, the pneumatic pressure switch 46 will be described in more detail. An exemplary pressure switch that can be used in the non-electric auto shut off circuit is the Amero model P25 manufactured by Amero Compressore. The pneumatic pressure switch 46 includes a housing 70, a differential screw 72 and a pressure rod 74. The housing 70 includes a screw fitting 76 for coupling to or otherwise attaching the housing 72 to a pneumatic line, such as a compressed air line or the like. An inlet 78, which is an open channel formed within an inner portion of the screw fitting 76, is coupled to an outlet 80 via a pressure chamber 82. As will be described in more detail below, the inlet 78 receives a pneumatic signal and, upon the signal exceeding a preset pressure threshold, the pneumatic switch 46 passes the received signal to the outlet 80 via the pressure chamber 82. The housing 70 also includes a threaded bore 84 for receiving the differential screw 72.

The differential screw 72 can be an elongated shaft having an outer threaded portion 90 for interfacing with the threaded bore 84 of the housing 72. A threaded lock nut 92 can interface with the outer threaded portion 90 of the differential screw 72 and can be adjusted so as to apply a force between the housing 70 and the differential screw 72, thereby inhibiting or otherwise tending to prevent rotation of the differential screw 72 with respect to the housing 70. Between the housing 70 and the differential screw 72 is a sealing ring 94, which interfaces with a groove 96 of the differential screw 72 and a wall 98 of the pressure chamber 82. The sealing ring 94 preferably is made from an elastic material, and seals the interface between the differential screw and the housing so as to prevent air or gas from escaping therebetween. The differential screw also includes a threaded bore 100, which is formed within and extends through the differential screw 72.

The pressure rod 74 is an elongated shaft that has an outer threaded portion 104 for interfacing with the threaded bore 100 of the differential screw 72. A threaded lock nut 106 can interface with the outer threaded portion 104 of the pressure rod 74 and can be adjusted so as to apply a force between the pressure rod 74 and the differential screw 72, thereby inhibiting or otherwise tending to prevent rotation of the pressure rod 74 with respect to the differential screw 72. A vent 116 extends through the pressure rod 74 so as to allow air or other gasses to slowly escape from the pressure chamber 102. The pressure rod 74 also includes a plunger or movable shaft 108 having an elongated shape, wherein the movable shaft 108 fits within the vent 116 and can move in an axial direction with respect to the pressure rod 74. A spring 110 interfaces with a wall 112 of the pressure rod and a flange 114 of the movable shaft 108, wherein a force generated by the spring 110 tends to extend the movable shaft out of the pressure rod 74.

A distal end 118 of the movable shaft 108 has a "V" shape socket 108a that interfaces with a ball 120. The movable shaft 108, via the spring 110, generates a force against the ball 120 so as to tend to press the ball 120 into a valve seat 122, thereby blocking the inlet 76 and preventing the inflow of air or other gas into the pressure chamber 82. The moveable shaft 108, spring 110, ball 120 and seat 122 act as a signal pressure switch that can selectively pass a pneumatic signal from the inlet 78 to the outlet 80 of the pressure switch 46.

The pressure switch 46 can have a fixed or adjustable shut off and dead band. According to one embodiment, the threshold pressure of the pneumatic pressure switch 46 can be altered by changing the depth of the differential screw 72 into the housing 70 and/or the depth of the pressure rod 74 into the differential screw 72. For example, the threshold pressure can be decreased by rotating the pressure rod 74 with respect to the differential screw 72 so as decompress the spring 110. As the spring 110 is decompressed, the spring applies less force to the movable shaft 108 and, therefore, to the ball 120. Since less force is applied to the ball, the pressure required at the inlet 78 to move the ball 120 off the seat 122 also is decreased. Conversely, the threshold pressure for opening or closing the pneumatic switch 46 can be increased by rotating the pressure rod 74 with respect to the differential screw 72 so as to compress the spring 110. As the spring 110 is compressed, a greater force is applied to the movable shaft 108 and, therefore, to the ball 120. Since a greater force is applied to the ball 120, the pressure required at the inlet 78 to move the ball 120 off the seat 122 also is increased.

In operation, air or gas enters the inlet 78 of the pneumatic switch 46 and acts against the ball 120, thereby exerting a force against the movable shaft 108. If the air generates a force on the ball 120 that is less than a force generated by the movable shaft 108 and spring 110, then the ball 120 remains against the seat 122 and, thus, air will not flow through the pressure switch 46. If, however, the air generates a force on the ball 120 that exceeds a force generated by the movable shaft 108 and spring 110, then the movable shaft 108 and ball 120 move in an axial direction away from the inlet 78, thereby compressing the spring 110 and allowing air or gas to enter the pressure chamber 82. The air fills the pressure chamber 82 and exits via the outlet 80, which can provide a control signal to an external device, such as the pressure valve 28.

As the force applied to the ball 120 by the air or gas at the inlet 78 decreases to a level below the force applied to the ball 120 by the movable shaft 108 and spring 110, the movable shaft 108 moves in an axial direction toward the inlet 78 so as to push the ball 120 into the valve seat 122, thereby cutting off the flow of air or gas into the pressure chamber 82. Pneumatic pressure remaining in the pressure chamber 102 slowly bleeds out by escaping between a small 124 between the movable rod 108 and the walls of the vent 116.

Accordingly, a gas separation system automatic shut off circuit 48 that does not require electrical power has been disclosed. The circuit is advantageous in that external electrical connections are not required, thereby minimizing installation and operating costs, and allowing the system to be located in areas that may not have electrical power. Using the circuit, compressed air can be delivered to the system on an as needed basis, thereby reducing the load placed on compressed air or gas delivery equipment and, therefore, increasing the life and/or maintenance interval of such equipment.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A gas separation system for separating one or more components from a plurality of gas components, comprising:
   a gas separator;
   an inlet operatively coupled to said gas separator for providing the plurality of gas components to the gas separator, and an outlet operatively coupled to said gas separator for providing a separated gas component from the separator; and
   a non-electric automatic shut off circuit for controlling delivery of the plurality of gas components to the inlet, said circuit including
   i) a pneumatically operated valve coupled to said inlet and operative to enable or disable flow of the plurality of gas components to the inlet, and
   ii) a pressure switch coupled to said outlet and operative to monitor a gas pressure at said outlet, said pressure switch operatively coupled to said valve,
   wherein based on the monitored gas pressure, said pressure switch non-electrically commands said valve to enable or inhibit the flow of the plurality of gas components.

2. The gas separation system of claim 1, wherein the gas separator includes at least one permeable membrane for separating the one or more components from the plurality of components.

3. The gas separation system of claim 2, further comprising:
   at least one filter to remove contaminants from the the plurality of gas components;
   a flow control valve to regulate the rate of flow of the one or more components out of the at least one permeable membrane;
   a back pressure control valve to maintain constant downstream pressure in the system;
   a check valve to restrict a direction of flow of the one or more components in a single direction;
   a storage vessel to store the one or more components; and
   a dispensing station to dispense the one or more components from the system.

4. The gas separation system of claim 3, wherein the at least one filter is a coalescing filter.

5. A gas separation system for separating one or more components from a plurality of gas components, comprising:
   a gas separator; and
   a non-electric automatic shut off circuit for controlling the delivery of the plurality of gas components to the gas separator,
   wherein the non-electric automatic shut off circuit comprises:
   a pneumatically operated valve that enables or inhibits a flow of the plurality of components to the gas separator, and a pneumatic pressure switch operatively coupled to the pneumatically operated valve, wherein the pneumatic pressure switch monitors a pressure indicative of a demand for the one or more components, and the pneumatic pressure switch commands the pneumatically operated valve to enable or inhibit the flow of the plurality of components based on the monitored pressure wherein the pneumatic pressure switch comprises:

an inlet for receiving the one or more components;

an outlet or expelling the one or more components, said outlet being operatively coupled to the pneumatically operated valve;

a pressure chamber coupling the inlet to the outlet; and a signal pressure switch, said signal pressure switch enabling the one or more components to enter the inlet, fill the pressure chamber and exit via the outlet upon a pressure of the one or more components exceeding a threshold pressure, and inhibiting the one or more components from entering the inlet, pressure chamber and outlet upon the pressure of the one or more components being below the threshold pressure.

6. The gas separation system of claim 5, wherein when the pneumatic pressure switch inhibits the one or more components from entering the inlet, substantially all of the one or more components remaining in the outlet and pressure chamber are expelled from the pneumatic pressure switch through a vent.

7. The gas separation system of claim 6, wherein the signal pressure switch comprises a moveable shaft and a ball valve, the ball valve capable of interfacing with both the moveable shaft and a valve seat of the inlet, wherein the moveable shaft applies a force to the ball valve that tends to push the ball valve into the valve seat, thereby preventing the one or more components from entering the pressure chamber.

8. The gas separation system of claim 7, wherein an interface between the movable shaft and a wall of the vent permits the one or more components within the pressure chamber and the outlet to enter the vent and bleed out of the pneumatic pressure switch.

9. A gas separation system for separating one or more components from a plurality of gas components, comprising:

a gas separator; and a non-electric automatic shut off circuit for controlling the delivery of the plurality of gas components to the gas separator, wherein the non-electric automatic shut off circuit comprises:

a pneumatically operated valve that enables or inhibits a flow of the plurality of components to the gas separator, and a pneumatic pressure switch operatively coupled to the pneumatically operated valve, wherein the pneumatic pressure switch monitors a pressure indicative of a demand for the one or more components, and the pneumatic pressure switch commands the pneumatically operated valve to enable or inhibit the flow of the plurality of components based on the monitored pressure wherein the command to inhibit the flow of the plurality of components comprises the one or more components, said one or more components being under pressure and applied to the pneumatically operated valve via a control conduit coupled between the pneumatically operated valve and the pneumatic pressure switch.

10. The gas separation system of claim 9, wherein the command to enable the flow of the plurality of components comprises substantial removal of the pressurized one or more components from the pneumatically operated valve.

11. The gas separation system of claim 1, wherein the plurality of components comprise compressed air and the one or more components comprise nitrogen, said nitrogen being extracted from the compressed air.

12. The gas conditioning system of claim 1, wherein the plurality of components comprise compressed air and the one or more components comprise dry air, said dry air being extracted from the compressed air.

13. A method for controlling a flow of a plurality of components into a gas separation system and providing one or more components therefrom, said gas separation system including a gas separator, an inlet operatively coupled to said gas separator for providing the plurality of gas components to the gas separator, and an outlet operatively coupled to said gas separator for providing a separated gas component from the separator, and a non-electric automatic shut off circuit for controlling delivery of the plurality of gas components to the inlet, said circuit including i) a pneumatically operated valve coupled to said inlet, and ii) a pressure switch coupled to said outlet, the method comprising:

using the pressure switch to non-electrically monitor a pressure at the outlet;

based on the monitored outlet pressure, non-electrically and automatically commanding the valve to enable or inhibit the flow of the plurality of gas components to the gas separator.

14. The method of claim 13, wherein non-electrically monitoring the pressure in the gas separation system includes non-electrically monitoring a pressure indicative of a demand for the one or more components.

15. The method of claim 13, wherein non-electrically and automatically commanding the valve to enable or inhibit includes non-electrically enabling the flow of the plurality of components to the gas separator when the monitored pressure is below a threshold pressure; and non-electrically inhibiting the flow of the plurality of components to the gas separator when the monitored pressure is above a threshold pressure.

16. The method of claim 13, further comprising:

using a first threshold pressure for enabling the flow of the plurality of components; and using a second threshold pressure for inhibiting the flow of the plurality of components, wherein the second threshold pressure is different from the first threshold pressure.

* * * * *